C. I. WARE.
BED PLATE.
APPLICATION FILED MAY 10, 1916.
1,212,159.
Patented Jan. 9, 1917.
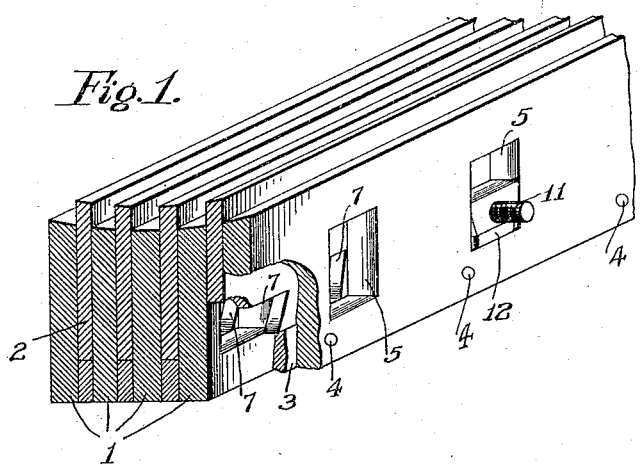
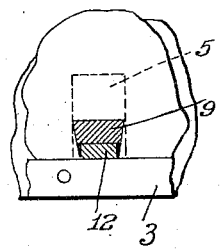
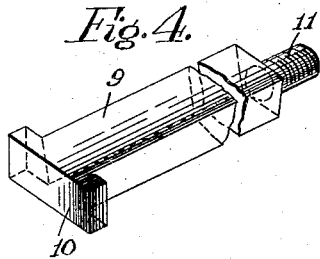
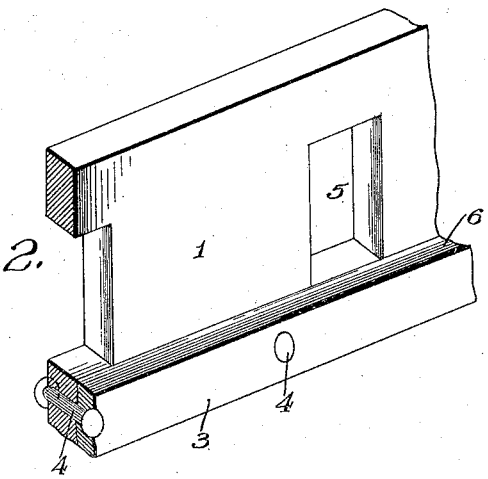
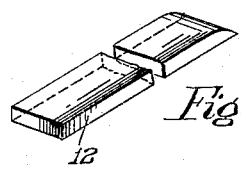
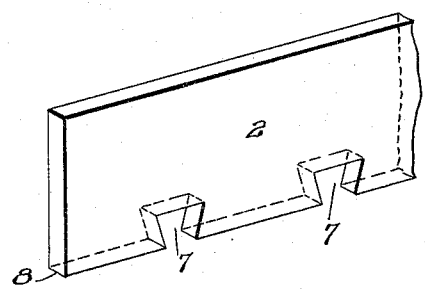
Inventor:
Charles Irving Ware
By Harry W. Bowen.
Attorney.

UNITED STATES PATENT OFFICE.

CHARLES IRVING WARE, OF HOLYOKE, MASSACHUSETTS, ASSIGNOR OF ONE-HALF TO FRED E. MAXFIELD, OF HOLYOKE, MASSACHUSETTS.

BED-PLATE.

1,212,159.  Specification of Letters Patent.  Patented Jan. 9, 1917.

Application filed May 10, 1916. Serial No. 96,552.

*To all whom it may concern:*

Be it known that I, CHARLES IRVING WARE, a citizen of the United States of America, residing in the city of Holyoke, county of Hampden, and State of Massachusetts, have invented certain new and useful Improvements in Bed-Plates, of which the following is a specification.

This invention relates to improvements in bed plates which are employed in the lower part of the bed portion of a beater engine. These engines, as well known, are used for the purpose of grinding rags for the production of pulp in the process of making paper by means of the usual roll-bars which rotate in close proximity to the bars of the bed plates. The bed plates are composed of what is known in the art as filler and cutting bars, the cutting bars extend above the filler bars in a well known manner. The filler bars serve to space the cutting bars from each other. From time to time these cutting bars as now constructed have to be taken out and reground and readjusted. This process is slow and expensive.

An object of the invention is to produce a structure which will positively retain the cutting bars in place and prevent them from moving either vertically or horizontally.

Broadly stated, the present invention comprises a plurality of filler bars which are formed with vertical openings, a rib attached to the lower edge of each bar, cutting bars, the lower edge of each of which is formed with dove-tailed openings that extend to the lower marginal edge of the bar and means comprising bolts that are dove-tailed in cross section, and passing through the openings in the bars, for clamping the filler and cutting bars together, and a wedge or plate adapted to be driven through the openings in the bars and below the clamping bolts for the purpose of elevating the cutting bars, as occasion requires. I attain the above object by the structures shown in the accompanying drawings in which:

Figure 1 is a perspective view showing the manner of assembling the bars, a portion of the cutting and filler bars being broken away to illustrate the manner of assembling, also showing one of the clamping bolts extending through the openings; Fig. 2 is a perspective view of one end of the filler bars illustrating the rectangular shaped openings therethrough and the rib at the bottom edge below the openings; Fig. 3 is a detail perspective view of a portion of one of the cutting bars showing the dove-tailed or wedge shaped openings in the lower edge of the same; Fig. 4 is a detail view of the clamping bolt, the main portion of the bolt being wedge-shaped in cross section to correspond with the openings in the cutting bars; Fig. 5 is a view of one of the wedges that is driven through the registering openings and below the bolt; Fig. 6 is a detail view in section illustrating the bolt and wedge in position, for the purpose of elevating the cutting bar relative to the filler bar.

Referring to the drawings in detail: 1 designates the filler bars and 2 the cutting bars.

3 is a rib that is secured to the lower edge of each of the bars 1 by means of rivets 4, or any other suitable means. The bar 1 is formed with vertically arranged openings 5 preferably rectangular in shape, the lower edge or border of these openings being in the same plane as the upper edge 6 of the rib. Each of the cutting bars 2 are formed in their lower edges with dove-tailed or wedge shaped openings 7. These openings, as shown in Fig. 3, extend or terminate at the lower edge 8 of the bars. The cutting and filler bars are assembled, as illustrated in Fig. 1. That is to say the cutting bars 2 are placed on the upper edges 6 of the strip 4. In assembling the bars the openings 5 and 7 in the respective bars are placed so as to register with each other. It will be observed that the width of the openings 5 and 7 are equal. For the purpose of clamping the bars together the bolt 9, shown in Fig. 4, is employed, the cross section of this bolt being wedge-shaped to agree with the wedge-shaped openings in the cutting bars 2. This bolt is provided with a head 10 and the threaded part 11. When the bars are assembled the lower surface of the bolt 9 engages the lower surface or face of the openings 5 and 7 and the upper surface of the rib 3. As the cutting bars 2 are worn down they are readjusted vertically by means of the wedges or plates 12, shown in Fig. 5. These wedges are driven through the registering openings 5 and 7 and below the bolts 9. This operation causes the cutting bars 2 to be carried upward by means of the bolts 9 into a new position. The bars are then reclamped by means of nuts on the threaded nut 11 of the bolts.

One important feature of the present invention is that the wedge-shaped or dove-tailed openings 7 perform two functions, first, preventing lateral or longitudinal displacement of the cutting bars 2 relative to the filler bars, second, preventing the upward displacement of the cutting bars after being assembled.

In the prior construction of bed plates the slots 7 have been formed with vertical sides. This construction fails to prevent the cutting bars from working upward. It is to be understood that the openings 5 are of such dimension that several wedges may, if desired, be driven through these openings and below the bolts 9 for the purpose of raising the cutting bars 2. By using the wedge shaped openings 7 the entire cutting bar may be used before it is discarded, thereby effecting a saving in material and lengthening the life of the bed plate as a whole.

From this construction it will be seen that I have provided a bed plate that is very readily assembled and one that can be quickly and accurately adjusted, also one that has a long life and is not liable to get out of order after the same is assembled.

What I claim is:

1. A bed plate construction comprising filler and cutting bars, the cutting bars having wedge-shaped openings therethrough, wedge-shaped means passing through said openings for clamping the bars together for preventing lateral and vertical displacement of the cutting bars relative to the filler bars, and means extending through said openings for elevating the cutting bars relative to the filler bars.

2. A bed-plate composed of filler and cutting bars, the filler bars having rectangular shaped openings therethrough, the cutting bars having wedge or dove-tailed shaped openings, the lower end of said openings corresponding with the lower edge of the cutting bars, securing bolts, wedge-shaped in cross section to engage the openings in the filler and cutting bars for clamping the same together, whereby the cutting bars are prevented from vertical and longitudinal movements.

3. A bed-plate for beating engines composed of filler and cutting bars, the filler bars having a rib secured to the lower side thereof, the filler bars having openings therethrough, their lower surface registering with the upper edge of the rib, cutting bars having openings therethrough and when assembled their lower edges registering with the upper edges of the ribs, and means passing through the openings of the bars for clamping the same together, and means comprising plates or wedges designed to be driven through the openings below the clamping means for elevating the cutting bars, as desired.

4. A cutting bar for bed plates, the lower edge of which is formed with wedge-shaped openings extending to the lower marginal edge of the same.

5. A bed plate composed of filler and cutting bars, the filler bars having openings therethrough, a rib secured to the lower side of the same, the cutting bars having wedge-shaped openings through the lower edge of the same, means comprising a bolt wedge-shaped in cross section for clamping the bars together, and means comprising plates or wedges adapted to be driven through the openings and above the ribs, for elevating the cutting bars, as described.

CHARLES IRVING WARE.

Copies of this patent may be obtained for five cents each, by addressing the "Commissioner of Patents, Washington, D. C."